(12) United States Patent
Xiang et al.

(10) Patent No.: US 12,140,349 B2
(45) Date of Patent: Nov. 12, 2024

(54) LIQUID BLOCKING DEVICE AND EVAPORATOR THEREOF

(71) Applicant: Carrier Corporation, Palm Beach Gardens, FL (US)

(72) Inventors: Liang Xiang, Shanghai (CN); Xin Wang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 256 days.

(21) Appl. No.: 17/763,433

(22) PCT Filed: Sep. 24, 2020

(86) PCT No.: PCT/US2020/052366
§ 371 (c)(1),
(2) Date: Mar. 24, 2022

(87) PCT Pub. No.: WO2021/061889
PCT Pub. Date: Apr. 1, 2021

(65) Prior Publication Data
US 2022/0341636 A1  Oct. 27, 2022

(30) Foreign Application Priority Data
Sep. 27, 2019 (CN) .......................... 201910923069.4

(51) Int. Cl.
*F25B 39/02* (2006.01)
*B01D 1/30* (2006.01)
(Continued)

(52) U.S. Cl.
CPC .............. *F25B 39/02* (2013.01); *B01D 1/305* (2013.01); *F25B 43/00* (2013.01);
(Continued)

(58) Field of Classification Search
CPC .... F25B 39/02; F25B 43/00; F25B 2339/024; F25B 2500/06; B01D 1/305;
(Continued)

(56) References Cited

U.S. PATENT DOCUMENTS

2012/0266599 A1* 10/2012 Berger .................... F28F 13/08
62/515
2015/0007960 A1* 1/2015 Kawano .................. F24T 10/30
165/104.31

FOREIGN PATENT DOCUMENTS

CN         102914094 A     2/2013
CN         203298544 U    11/2013
(Continued)

OTHER PUBLICATIONS

Pdf is translation of foreign reference CN 106440547 A (Year: 2017).*
(Continued)

*Primary Examiner* — Len Tran
*Assistant Examiner* — Kamran Tavakoldavani
(74) *Attorney, Agent, or Firm* — CANTOR COLBURN LLP

(57) ABSTRACT

The present application discloses an evaporator and a liquid blocking device thereof. The liquid blocking device includes: a body, which has a plate-shaped first separator extending in a longitudinal direction, the first separator having a plurality of holes, and the plurality of holes communicating an exterior of the body with an interior of the body; and a second separator attached to the body, the second separator being configured to have a plurality of openings which abut each other, so that a pressure drop generated when a fluid passes through the second separator via the openings is less than a pressure drop generated when the fluid passes through the first separator. The present application can improve the effect of gas-liquid separation.

9 Claims, 4 Drawing Sheets

(51) Int. Cl.
*F25B 43/00* (2006.01)
*F28D 21/00* (2006.01)

(52) U.S. Cl.
CPC .... *F25B 2339/024* (2013.01); *F28D 21/0017* (2013.01); *F28D 2021/0071* (2013.01)

(58) Field of Classification Search
CPC .......... F28D 21/0017; F28D 2021/0071; F28F 9/005; F28F 19/01
See application file for complete search history.

(56) References Cited

FOREIGN PATENT DOCUMENTS

| | | | |
|---|---|---|---|
| CN | 103925746 A | | 7/2014 |
| CN | 203908141 U | | 10/2014 |
| CN | 106440547 A | * | 2/2017 .............. F25B 39/02 |
| CN | 106802028 A | | 6/2017 |
| CN | 107062706 S | | 8/2017 |
| CN | 104848605 B | | 11/2017 |
| CN | 207006638 U | | 2/2018 |
| CN | 207487179 U | | 6/2018 |
| CN | 108562070 A | | 9/2018 |
| CN | 108826760 A | | 11/2018 |
| WO | 2012107645 A1 | | 8/2012 |
| WO | 2019116072 A1 | | 6/2019 |

OTHER PUBLICATIONS

Chinese Office Action for Application No. 201910923069.4; Issued Mar. 2, 2023; 8 Pages.
International Search Report for Application No. PCT/US2020/052366; Issued Nov. 30, 2020, 5 Pages.
Written Opinion for Application No. PCT/US2020/052366; Issued Nov. 30, 2020, 8 Pages.

* cited by examiner

LIQUID BLOCKING DEVICE AND EVAPORATOR THEREOF

CROSS-REFERENCE TO RELATED APPLICATIONS

This application is a 371 U.S. National Stage application of PCT/US2020/052366, filed Sep. 24, 2020, which claims priority to Chinese Application No. 201910923069.4, filed Sep. 27, 2019, both of which are incorporated by reference in their entirety herein.

FIELD OF THE INVENTION

The present application belongs to the field of refrigeration devices, and specifically relates to a liquid blocking device for an evaporator and an evaporator having the liquid blocking device.

BACKGROUND OF THE INVENTION

A refrigerant gas resulting from evaporation in an evaporator, especially in a flooded evaporator, entrains some liquid droplets. If this portion of liquid droplets enters a compressor, it will cause harm to the compressor. Therefore, a liquid blocking device such as a baffle is provided at a suction port of the evaporator to intercept liquid in the gas. When the gas passes through the baffle, it may change its path, and at the same time it collides with the baffle. The liquid droplets are attached to the baffle, gather into large liquid droplets during a descending process along the baffle, and finally fall down under the gravity. The filtered gas leaves the evaporator from the suction port.

Providing the baffle is one of the effective ways to alleviate the above problems, but more designs focus on the change of the baffle itself, and tend to use expensive designs to reduce a liquid entrainment rate.

SUMMARY OF THE INVENTION

An aspect of the present application is to provide a liquid blocking device for an evaporator, which has an improved liquid blocking effect.

The present application relates to a liquid blocking device for an evaporator, the liquid blocking device including:
  a body, which has a plate-shaped first separator extending in a longitudinal direction, the first separator having a plurality of holes, and the plurality of holes communicating an exterior of the body with an interior of the body; and
  a second separator attached to the body, the second separator being configured to have a plurality of openings which abut each other, so that a pressure drop generated when a fluid passes through the second separator via the openings is less than a pressure drop generated when the fluid passes through the first separator.

In the liquid blocking device described above, the plurality of openings are distributed throughout the second separator.

In the liquid blocking device described above, the second separator is formed into a mesh shape.

In the liquid blocking device described above, the second separator is a wire mesh made of metal.

In the liquid blocking device described above, the second separator is disposed on the exterior of the body, so that the fluid passes through the second separator and then passes through the first separator; or the second separator is disposed in the interior of the body, so that the fluid passing through the first separator passes through the second separator.

In the liquid blocking device described above, the first separator and the second separator are integrated together, or the first separator and the second separator are provided separately.

In the liquid blocking device described above, the second separator is composed of at least one section, and the at least one section is configured to surround the body in a circumferential direction.

In the liquid blocking device described above, the body has a bottom portion and two opposite side portions, and the bottom portion is configured to have a solid plate shape to prevent fluid from entering the interior from the exterior of the body; the combined first separator and second separator are disposed on the side portions.

In the liquid blocking device described above, the plurality of holes of the first separator are divided into at least a first hole area, a second hole area, and a third hole area; wherein each of the first hole area, the second hole area and the third hole area has a hole array, and the plurality of openings of the second separator overlap with at least one of the hole arrays.

The liquid blocking device of the present application realizes multiple times of separation by providing multiple separators. As compared with the one-time separation of existing liquid blocking devices, the present application can increase the gas-liquid separation effect. The newly added second separator is a separator that is different from the first separator. After traditional separation, a pressure drop of refrigerant will be generated, whereas in the present application, the refrigerant can generate a small or even nearly zero pressure drop after passing through the second separator. Therefore, it will not affect the pressure of the vapor portion of the refrigerant.

The second separator is shaped to have a mesh structure, such as a wire mesh, which is easy to implement.

The second separator of the present application can be added to the existing liquid blocking devices. Through various known attachment techniques, the second separator is attached to the liquid blocking device, especially the liquid blocking device with a perforated plate.

As compared with the liquid blocking device with only one-time separation, the present application can further alleviate the liquid entrainment phenomenon in the evaporator without excessively increasing the pressure drop of the refrigerant gas. The present application can make the design of the evaporator more compact and effective.

Another aspect involved in the present application is to provide an evaporator, which includes:
  an evaporator body;
  an inlet, via which a refrigerant enters the inside of the evaporator body; and
  an outlet, wherein the refrigerant exits from the inside of the evaporator body via the outlet; the evaporator further includes:
  the liquid blocking device as described above, which is provided at the outlet.

In the present application, the liquid blocking device can reduce the liquid entrainment rate of the refrigerant, and therefore can further reduce the liquid-entrained portion of the refrigerant that enters the compressor, thereby improving the working efficiency of the compressor, and thereby improving the heat exchange performance of the entire refrigeration circuit.

Through the following detailed description with reference to the accompanying drawings, other aspects and features of the present application will become apparent. However, it should be understood that the drawings are only designed for the purpose of explanation, not intended to limit the scope of the present application since it should be accorded with the appended claims. It should also be understood that the drawings are only intended to conceptually illustrate the structures and processes described herein, and the drawings are not necessarily drawn to scale, unless otherwise indicated.

BRIEF DESCRIPTION OF THE DRAWINGS

The present application will be more fully understood with reference to the detailed description of the following specific embodiments in conjunction with the accompanying drawings, wherein.

DETAILED DESCRIPTION OF THE EMBODIMENT(S) OF THE INVENTION

In order to help those skilled in the art accurately understand the subject matter claimed in the present application, specific embodiments of the present application will be described in detail below with reference to the accompanying drawings. In the same or different drawings, the same or similar components are represented by the same or similar reference signs.

Figure 1:
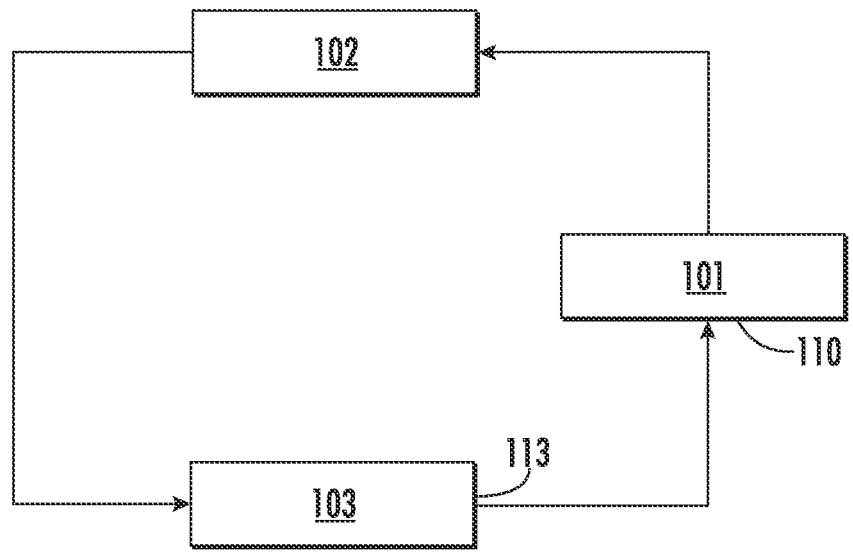
FIG. 1 shows a block diagram of a refrigeration circuit according to the present application.

The liquid blocking device involved in the present application is used in refrigeration devices such as evaporators, particularly flooded evaporators in which liquid entrainment occurs. In a refrigeration circuit shown in FIG. 1, a corepressor 101 is configured to receive a refrigerant from an evaporator 103 and discharge the refrigerant to a condenser 102. The condenser 102 then discharges the refrigerant to the evaporator 103, and the evaporator 103 receives the refrigerant and finally circulates the refrigerant to the compressor 101. An inlet 110 of the compressor 101 is connected to an outlet 113 of the evaporator 103 via a pipeline, and the refrigerant front the evaporator 103 is drawn into the compressor 101 by suction. The liquid blocking device of the present application is provided at the outlet 113 of the evaporator 103, and the refrigerant gas inside of the evaporator 103 passes through the liquid blocking device before passing through the outlet. Liquid droplets in the refrigerant gas are intercepted when passing through the liquid blocking device, thereby allowing the refrigerant gas to enter the outlet and then flow into the compressor.

Figure 2:
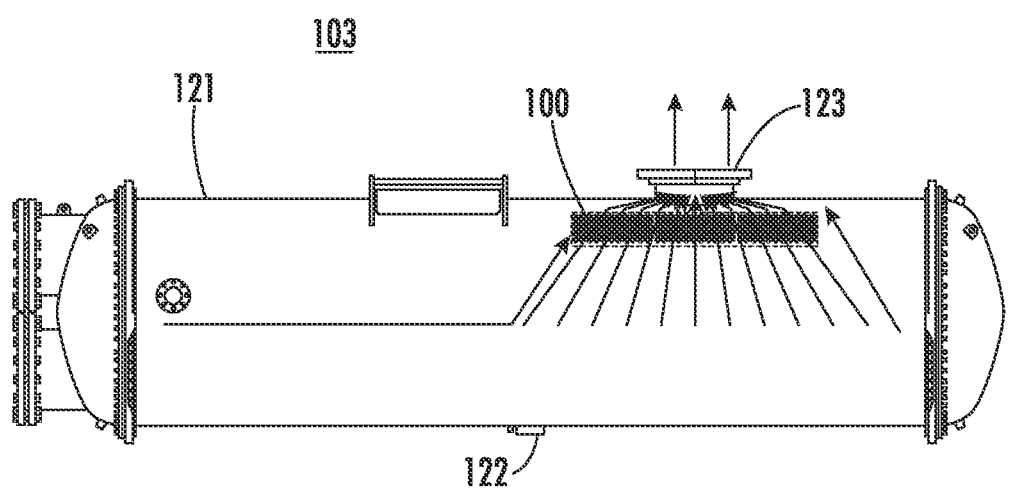
FIG. 2 shows a schematic diagram of an embodiment of an evaporator involved in the present cation.

FIG. 2 shows a schematic diagram of an embodiment of an evaporator involved in the present application. The evaporator 103 includes a housing 121, which divides the evaporator into an inside and an outside. The evaporator 103 also includes an inlet 122 at the bottom and a suction port or outlet 123 at the top, and a liquid blocking device 100 is disposed below the outlet 123. It can be seen from the figure that the refrigerant flows toward the outlet 123 in the directions of the arrows inside the evaporator, and passes through the liquid blocking device 100 before entering the outlet 123, so that liquid droplets in the refrigerant gas are blocked at the outlet 123. The liquid blocking device may be connected to the housing 121 of the evaporator by welding or other conceivable methods.

The liquid blocking device of the present application includes a body having a first separator extending in a longitudinal direction for the refrigerant to pass through. The first separator is a plate-shaped structure having a plurality of holes disposed therein. These holes extend from the exterior to the interior of the body so that the outside and the inside of the body communicate with each other. When the refrigerant passes through the first separator via the holes, a pressure drop is generated.

The liquid blocking device of the present application also includes a second separator. The second separator is a separator different from the first separator. The second separator includes a plurality of openings, and the refrigerant passes through the second separator via these openings. When the refrigerant passes through the second separator, another pressure drop lower than that when the refrigerant passes through the first separator is generated.

In the present application, two different interceptions are used to improve the efficiency of liquid blocking. When the refrigerant passes through the second separator, a pressure drop that is lower than or even much lower than that when the refrigerant passes through the first separator be generated. When the refrigerant passes through the second separator, a nearly zero pressure drop can be generated.

Figure 3:
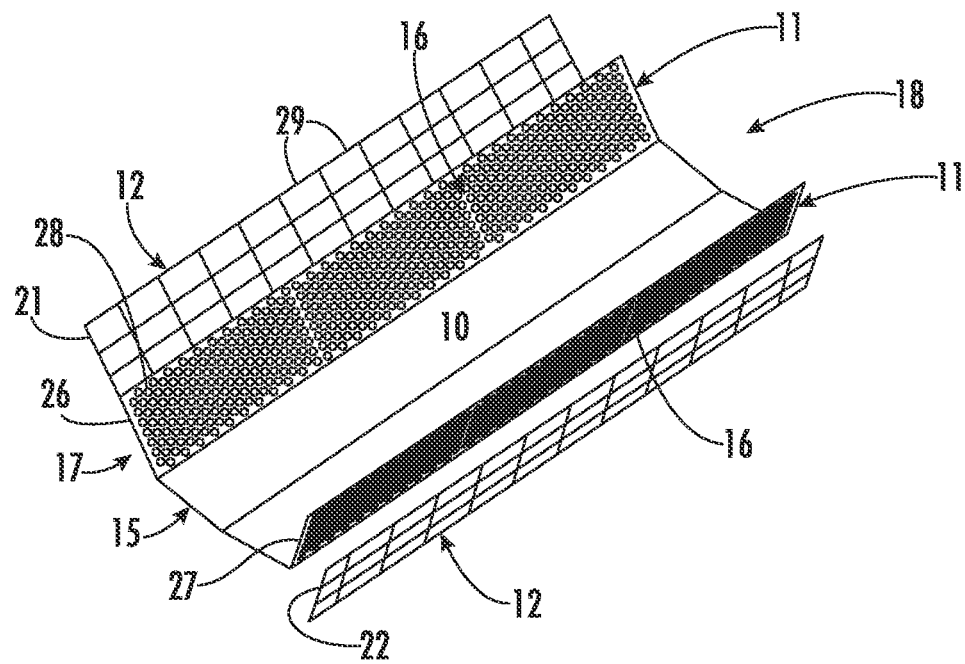
FIG. 3 shows a schematic diagram of a first embodiment of a liquid blocking device involved in the present application.

FIG. 3 shows a schematic diagram of a first embodiment of the liquid blocking device involved in the present application. The liquid blocking device includes a body 10 including a bottom portion 15, a front portion 17 and a rear portion 18, and two opposite side portions 16 between the front portion 17 and the rear portion 18. The side portions 16 are connected to the bottom portion 15. The front portion 17 and the rear portion 18 are open. The bottom portion 15 and the two opposite side portions 16 define the interior of the body 10, and when the liquid blocking device is installed with the evaporator, the interior communicates with the outlet of the evaporator. The body has a first separator 11 extending in a longitudinal direction. Herein, the longitudinal direction is also the length/axial extension direction of the evaporator (l, see FIG. 2). The positions of the front portion 17 and the rear portion 18 are in the longitudinal direction and can be interchanged. The first separator 11 has a plate shape. The first separator 11 includes a first plate 26 and a second plate 27 respectively provided on the two opposite side portions 16. A plurality of holes 28 are provided on the first plate 26 and the second plate 27 respectively. These holes 28 extend from the exterior of the body 10 to the interior of the body 10 in the plates to communicate the exterior with the interior of the body 10 so that the refrigerant flows from the exterior to the interior via the holes.

Figure 4:
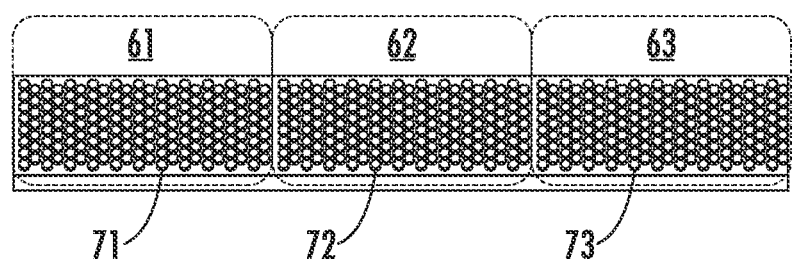
FIG. 4 shows a schematic diagram of a part of a first separator of the liquid blocking device in FIG. 3.

In the embodiment shown in FIG. 3, the first plate 26 and the second plate 27 are disposed on the two opposite side portions 16. The holes 28 of the first plate 26 and the second plate 27 are arranged symmetrically, and as shown FIG. 4, these holes are divided into a first hole area 61, a second hole area 62 and a third hole area 63. In FIG. 4, the first hole area 61, the second hole area 62, and the third hole area 63 are shown in dashed lines. A hole array 71, 72 and 73 formed by a plurality of the holes arranged in an orderly manner is disposed in each hole area. The refrigerant will flow from the exterior of the body into the interior of the body through these holes.

The number of hole areas may be modified according to the design, and may be greater than three or less than three. Similarly, the number of holes in the first plate 26 and the second plate 27 may also depend on the design. In addition, the holes of the first plate 26 and the second plate 27 are not limited to the symmetrical arrangement as shown in the figure, and may also be staggered. The shape of the hole is a circle in the figure, and may also be other shapes, including but not limited to, an ellipse, a semicircle, a polygon, a rhombus, a rectangle, etc.

Figure 5:
FIG. 5 shows a schematic diagram of a part of a body of the liquid blocking device in FIG. 3.

As shown in FIG. 5, the bottom portion 15 shown in the figure includes a first folded plate 81 and a second folded plate 82, and the first folded plate 81 and the second folded plate 82 form a V shape. It is conceivable that the bottom portion 15 may also have other shapes, including but not limited to, plate-shaped plane, curved surface with a curvature, etc.

The liquid blocking device of the present application further includes a second separator 12. In FIG. 3, for clarity of illustration, the liquid blocking device is shown as an exploded view, and the second separator 12 is separated from the first separator 11 by a certain distance. In fact, the second separator 12 is attached to the body 10, that is, in the illustrated embodiment, the second separator 12 is attached to the first separator 11. The second separator 12 is shaped into a mesh structure. The second separator 12 includes a plurality of openings 29 which are abut each other to form voids of the mesh structure. Unlike the holes of the first separator 11, there is a border between any openings 29 of the second separator 12, which defines the openings, and there are no other physical features. For example, without limitation, two adjacent openings 29 only have a border therebetween and they share the border. Therefore, there is almost no obstacle when the refrigerant passes through the openings of the second separator 12, resulting in a very small, even nearly zero, pressure drop. In contrast, when the refrigerant passes through the first separator 11, a certain pressure drop is generated due to various factors such as the thickness of the plate, the density of the holes, and the arrangement of the hole areas.

The plurality of openings 29 are distributed throughout the second separator 12, so that the second separator 12 may have a mesh structure in this entirety as shown in FIG. 3.

After the refrigerant passes through the second separator 12 and the first separator 11, the liquid therein is intercepted by the openings 29 and the holes 28, and the remaining refrigerant gas after gas-liquid separation is the desired gaseous refrigerant to be compressed.

The second separator 12 includes a first wire mesh 21 and a second wire mesh 22 disposed on the two opposite side portions 16 and corresponding to the first plate 26 and the second plate 27, respectively. The first wire mesh 21 and the second wire mesh 22 are connected to the first plate 26 and the second plate 27 on the exterior of the body by welding. The openings 29 overlap with the holes 28 so that the refrigerant passes through the second separator 12 via the openings 29 and then passes through the first separator 11 via the holes 28.

Since the bottom portion 15 is a solid plate, the refrigerant is prevented from passing through the liquid blocking device from the bottom portion 15. The first separator 11 and the second separator 12 also play a role of flow diversion, guiding the refrigerant from the exterior to the interior of the body via the side portions 16, and completing the gas-liquid separation.

The first wire mesh 21 and the second wire mesh 22 are made of metal, such as a wire mesh, and are therefore easy to implement. The first plate 26 and the second plate 27 are perforated plates made of metal. During the manufacturing, the body 10 with the perforated plates may be integrally formed first, and then iron wire meshes may be welded on the two side portions 16 to obtain the liquid blocking device of the present application.

In the illustrated embodiment, the first separator 11 has a denser hole arrangement. It is conceivable that the first separator 11 may also have a relatively sparse hole arrangement, and may be combined with the second separator 12 in the figure to form a two-time separation. For any liquid blocking device with perforated plates, the wire meshes of the present application shown in the figure may be arranged outside the perforated plates to enhance the gas-liquid separation effect.

In the illustrated embodiment, the area of the second separator 12, namely the first wire mesh 21 and the second wire mesh 22, is substantially the same as the area of the first plate 26 and the second plate 27. It is conceivable that the first wire mesh 21 and the second wire mesh 22 can be made smaller to combine with the partial first plate 26 and the second plate 27 to form a two-time separation. The shapes of the first wire mesh 21 and the second wire mesh 22 may be the same rectangular shape as the first plate 26 and the second plate 27, or may be other shapes; the first wire mesh 21 and the second wire mesh 22 may be of a planar shape, or may also be of a three-dimensional shape.

Figure 6:
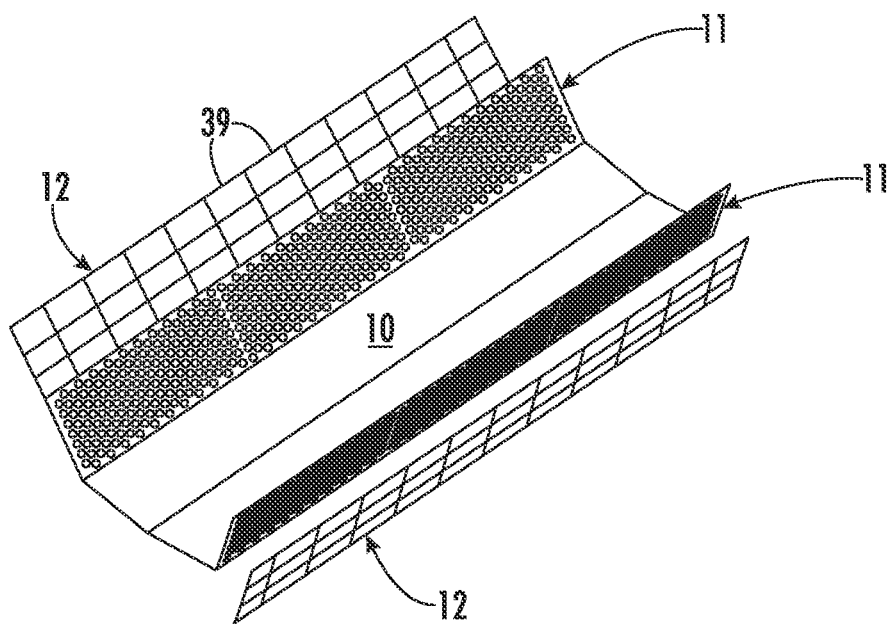
FIG. 6 shows a schematic diagram of a second embodiment of the liquid blocking device involved in the present application.

FIG. 6 shows a schematic diagram of a second embodiment of the liquid blocking device involved in the present application. In this embodiment, the body 10 is basically the same as the body in FIG. 3. For the clarity of illustration, the second separator 12 is spaced apart from the first separator 11, so that the disassembled liquid blocking device is shown. The second separator 12 has a mesh structure and has more openings 39 than the second separator in FIG. 3; that is, the density of the openings 39 of the second separator 12 is greater than that of the second separator in FIG. 3. In the illustrated embodiment, the refrigerant passes through the second separator 12 and then enters the first separator 11. Since the openings 39 of the second separator 12 are abut each other, the refrigerant has a small pressure drop when passing through the second separator 12, and at the same time, the liquid is intercepted by the voids of the mesh structure, thereby being separated from the gas.

The density of the openings 39 of the second separator 12 may be designed to be smaller. The shape of the opening 39 is not limited to the rectangular shape as shown in the figure, and may also be other shapes, including but not limited to a circle, a semicircle, an ellipse, a rhombus, a polygon, and the like. The diameter of the opening 39 may be designed to be larger than, equal to, or smaller than the diameter of the hole, and in each case, the refrigerant will pass through with a pressure drop close to zero.

Figure 7:
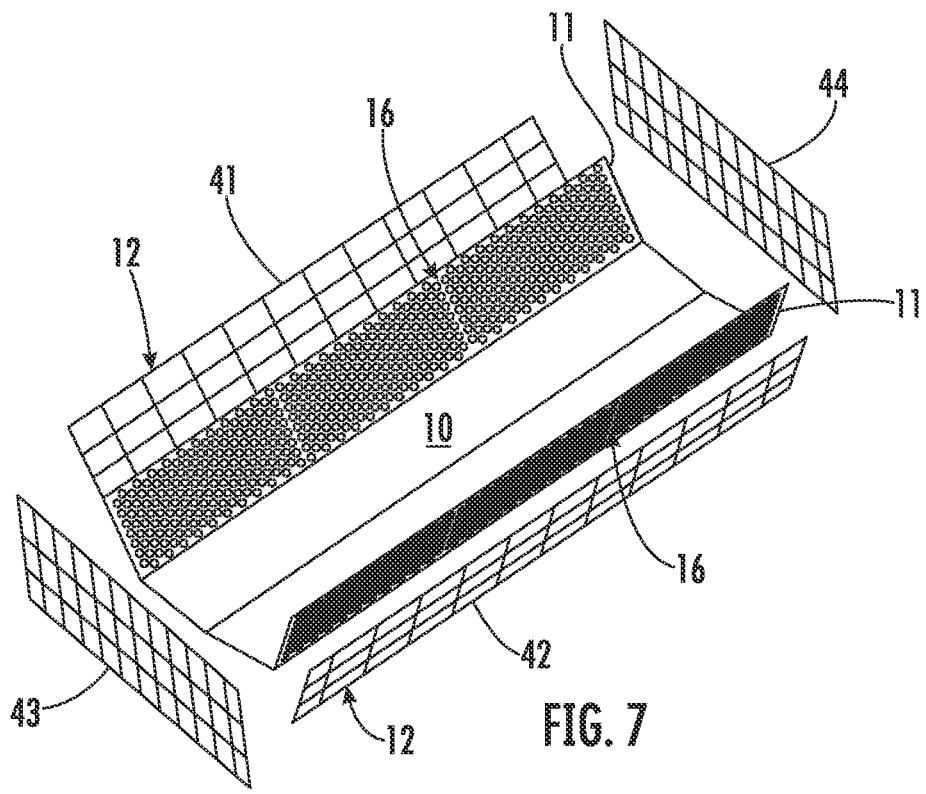
FIG. 7 shows a schematic diagram of a third embodiment of the liquid blocking device involved in the present application.

FIG. 7 shows a schematic diagram of a third embodiment of the liquid blocking device involved in the present application. In this embodiment, the body 10 is basically the same as the body in FIG. 2. For the clarity of illustration, the second separator 12 is spaced apart from the first separator 11, so that the disassembled liquid blocking device is shown. The second separator 12 includes a first wire mesh 41, a second wire mesh 42, a third wire mesh 43, and a fourth wire mesh 44. The first wire mesh 41 and the second wire mesh 42 are the same as those in FIGS. 3-6, and are disposed on two opposite side portions 16 of the body 10. The third wire mesh 43 and the fourth wire mesh 44 are respectively disposed on the front portion and rear portion of the body, whereby the first wire mesh 41, the second wire mesh 42, the third wire mesh 43 and the fourth wire mesh 44 surround the body 10 in a circumferential direction. The advantage of this arrangement is that the second separator 12 is divided into multiple sections; on one hand, the third wire mesh 43 and the fourth wire mesh 44 will not affect the flow of refrigerant, and the refrigerant has a nearly zero pressure drop when passing through the third wire mesh 43 and the fourth wire mesh 44; on the other hand, when the refrigerant passes through the third wire mesh 43 and the fourth wire mesh 44, gas-liquid separation occurs. This design can be adopted in a case where the longitudinal length of the liquid blocking device is long or short.

Of course, the body of the liquid blocking device may also be provided with perforated plates with the same separation principle as the first plate 26 and the second plate 27 on the front portion and rear portion, and a third wire mesh 43 and a fourth wire mesh 44 may be added on the basis of perforated plates.

In the illustrated embodiment, the first wire mesh 41, the second wire mesh 42, the third wire mesh 43 and the fourth wire mesh 44 are separated. It is conceivable that these wire meshes may also be integrated together and surround the body.

The first separator 11 and the second separator 12 may be integrated together, such as being connected by welding or by other known attachment techniques to form a multilayer combined separator as described above. It is conceivable that the first separator 11 and the second separator 12 may also be separately disposed on the body 10.

In the foregoing embodiment, the second separator 12 is disposed outside the first separator 11, so the refrigerant first passes through the second separator 12 for the first separation, and then passes through the first separator 11 for the second separation. It is conceivable that the order of separations is not limited to the above. The refrigerant may also be separated by the first separator 11 for the first time, and then separated by the second separator 12 for the second time. For example, without limitation, in the embodiments shown in FIGS. 3-7, the second separator 12 may be welded to the first separator 11 inside the body, or may be disposed separately from the first separator 11 in the body.

Figure 8:
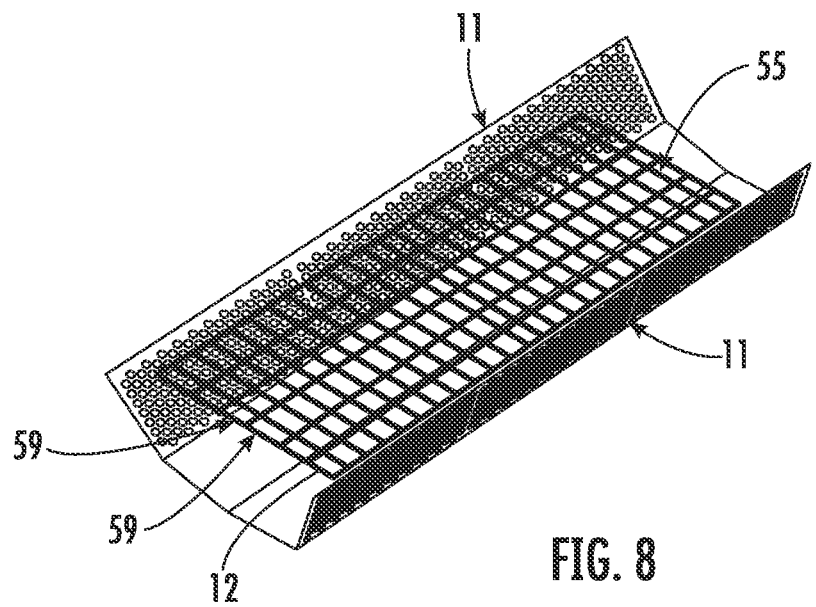
FIG. 8 shows a schematic diagram of a fourth embodiment of the liquid blocking device involved in the present application.

FIG. 8 shows a schematic diagram of a fourth embodiment of the liquid blocking device involved in the present application. In this embodiment, the body is basically the same as the body in FIG. 3. The second separator is disposed inside the body. The second separator 12 is shaped to have a mesh structure and is laid flat. The mesh structure includes a plurality of openings 59 abut each other. The second separator 12 is spaced by a certain distance apart from the bottom portion of the body. The refrigerant first passes through the first separator 11 via the holes for the first separation, then enters the interior of the body, and then passes through the second separator 12 via the openings for the second separation. In the illustrated embodiment, the second separator 12 is a fifth wire mesh 55 and is rectangular, it is conceivable that the second separator 12 may also be disposed close to the outlet of the evaporator, such as surrounding the outlet, so that the refrigerant is subject to gas-liquid separation again when it is about to leave the outlet. In the illustrated embodiment, the second separator 12 may be attached to the body by welding.

When the refrigerant passes through the liquid blocking device of the present application, gas-liquid separation occurs at least twice, and an ideal separation effect can be achieved.

While the specific embodiments of the present application have been shown and described in detail to illustrate the principles of the present application, it should be understood that the present application can be implemented in other ways without departing from the principles.

What is claimed is:

1. A liquid blocking device for an evaporator, comprising:
a body (10), which has a plate-shaped first separator (11) extending in a longitudinal direction, the first separator (11) having a plurality of holes (28), and the plurality of holes (28) communicating an exterior of the body (10) with an interior of the body (10); and
a second separator (12) attached to the body (10), the second separator (12) being configured to have a plurality of openings (29) which abut each other, so that a pressure drop generated when a fluid passes through the second separator (12) via the openings (29) is less than a pressure drop generated when the fluid passes through the first separator (12);
wherein the body (10) has a bottom portion (15) and two opposite side portions (16), and the bottom portion (15) is configured to have a solid plate shape to prevent fluid from entering the interior from the exterior of the body (10); the combined first separator (11) and second separator (12) are disposed on the side portions (16).

2. The liquid blocking device according to claim 1, wherein the plurality of openings (29) are distributed throughout the second separator (12).

3. The liquid blocking device according to claim 1, wherein the second separator (12) is formed into a mesh shape.

4. The liquid blocking device according to claim 3, wherein the second separator (12) is a wire mesh made of metal.

5. The liquid blocking device according to claim 1, wherein the second separator (12) is disposed on the exterior of the body (10), so that the fluid passes through the second separator (12) and then passes through the first separator (11); or the second separator (12) is disposed in the interior of the body (10), so that the fluid passing through the first separator (11) passes through the second separator (12).

6. The liquid blocking device according to claim 1, wherein the first separator (11) and the second separator (12) are integrated together, or the first separator (11) and the second separator (12) are provided separately.

7. The liquid blocking device according to claim 1, wherein the second separator (12) is composed of at least one section, and the at least one section is configured to surround the body (10) in a circumferential direction.

8. An evaporator, comprising:
an inlet (122), via which a refrigerant enters the inside of the evaporator; and
an outlet (123), wherein the refrigerant exits from the inside of the evaporator via the outlet (123);
wherein the evaporator further comprises:
the liquid blocking device according to claim 1, which is provided at the outlet (123).

9. A liquid blocking device for an evaporator, comprising:
a body (10), which has a plate-shaped first separator (11) extending in a longitudinal direction, the first separator (11) having a plurality of holes (28), and the plurality of holes (28) communicating an exterior of the body (10) with an interior of the body (10); and
a second separator (12) attached to the body (10), the second separator (12) being configured to have a plurality of openings (29) which abut each other, so that a pressure drop generated when a fluid passes through the second separator (12) via the openings (29) is less than a pressure drop generated when the fluid passes through the first separator (12);
wherein the plurality of holes (28) of the first separator (11) are divided into at least a first hole area (61), a second hole area (62), and a third hole area (63); and
wherein each of the first hole area (61), the second hole area (62) and the third hole area (63) has a hole array (71, 72, 73), and the plurality of openings (29) of the second separator (12) overlap with at least one of the hole arrays (71, 72, 73).

\* \* \* \* \*